(12) United States Patent
Morishima et al.

(10) Patent No.: US 12,128,946 B2
(45) Date of Patent: Oct. 29, 2024

(54) STEERING DEVICE AND LINER SLOT OF STEERING DEVICE

(71) Applicant: NSK Ltd., Tokyo (JP)

(72) Inventors: Tomonori Morishima, Gunma (JP); Tasuku Oishi, Gunma (JP); Jotaro Suzuki, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/269,186

(22) PCT Filed: Dec. 9, 2021

(86) PCT No.: PCT/JP2021/045282
§ 371 (c)(1),
(2) Date: Jun. 22, 2023

(87) PCT Pub. No.: WO2022/138193
PCT Pub. Date: Jun. 30, 2022

(65) Prior Publication Data
US 2024/0083489 A1    Mar. 14, 2024

(30) Foreign Application Priority Data

Dec. 24, 2020 (JP) ................................. 2020-215272

(51) Int. Cl.
*B62D 1/184* (2006.01)
(52) U.S. Cl.
CPC .................... *B62D 1/184* (2013.01)
(58) Field of Classification Search
CPC ........ B62D 1/195; B62D 1/189; B62D 1/185; B62D 1/184
See application file for complete search history.

(56) References Cited

U.S. PATENT DOCUMENTS 9,540,031 B2    1/2017  Tagaya et al.
2019/0106142 A1*  4/2019  Fricke ............... B62D 1/189

FOREIGN PATENT DOCUMENTS

| JP | 2009-096453 A | 5/2009 |
| JP | 2015-189259 A | 11/2015 |
| JP | 2016-049886 A | 4/2016 |

(Continued)

OTHER PUBLICATIONS

International Search Report for PCT/JP2021/045282 dated Feb. 15, 2022 [PCT/ISA/210].

*Primary Examiner* — Drew J Brown
(74) *Attorney, Agent, or Firm* — Sughrue Mion, PLLC (57) ABSTRACT

A steering device includes: an upper column having a cylindrical shape that is disposed on a radially outer side of a steering shaft; a lower column having a cylindrical shape that is fitted to the upper column and is capable of relatively moving in an axial direction with respect to the upper column; an attachment portion that is attached to the upper column and provided with a column long hole; a column bracket that includes a side plate portion located on a side of the upper column and is attached to a vehicle body; a liner slot that is inserted into the column long hole of the attachment portion and restricts an axial movement; and a pin that extends along a vehicle width direction and penetrates through the side plate portion and the liner slot, in which the liner slot is provided with a through-hole through which the pin penetrates.

10 Claims, 10 Drawing Sheets

(56) References Cited

FOREIGN PATENT DOCUMENTS

| | | | | |
|---|---|---|---|---|
| JP | 2017-035999 A | | 2/2017 | |
| JP | 2017185987 A | * | 10/2017 | ........... B60R 25/021 |
| JP | 2019043219 A | * | 3/2019 | ............ B62D 1/184 |
| KR | 10-2005-0033142 A | | 4/2005 | |
| KR | 20160070198 A | * | 6/2016 | |

* cited by examiner

STEERING DEVICE AND LINER SLOT OF STEERING DEVICE

CROSS REFERENCE TO RELATED APPLICATIONS

This application is a National Stage of International Application No. PCT/JP2021/045282 filed Dec. 9, 2021, claiming priority based on Japanese Patent Application No. 2020-215272 filed Dec. 24, 2020.

FIELD

The present disclosure relates to a steering device and a liner slot of the steering device.

BACKGROUND

A steering device of Patent Literature 1 includes a steering shaft coupled to a steering wheel and extending in an axial direction, a steering column supported on an outer peripheral side of the steering shaft, and a tilt mechanism for changing the height of the steering wheel according to the driver's physique, driving posture, and the like.

CITATION LIST

Patent Literature

Patent Literature 1: JP 2015-189259 A

SUMMARY

Technical Problem

Incidentally, the steering device may be provided with a telescopic mechanism that changes an axial position of the steering wheel. Since a steering device having the telescopic mechanism and a steering device not having the telescopic mechanism usually have different structures, they need to be manufactured individually, and it is difficult to share components. Accordingly, there is a demand for a steering device capable of using the same components as much as possible in both the specification having the telescopic mechanism and the specification not having the telescopic mechanism.

The present disclosure has been made in view of the above problem, and an object is to provide a steering device that suppresses an operation of a telescopic mechanism, and a liner slot attached to a steering device capable of selecting the specification having the telescopic mechanism and the specification not having the telescopic mechanism.

Solution to Problem

To achieve the above object, a steering device according to an embodiment comprising: an upper column having a cylindrical shape that is disposed on a radially outer side of a steering shaft; a lower column having a cylindrical shape that is fitted to the upper column and is capable of relatively moving in an axial direction with respect to the upper column; an attachment portion that is attached to the upper column and provided with a column long hole; a column bracket that includes a side plate portion located on a side of the upper column and is attached to a vehicle body; a liner slot that is inserted into the column long hole of the attachment portion and restricts an axial movement; and a pin that extends along a vehicle width direction and penetrates through the side plate portion and the liner slot, wherein the liner slot is provided with a through-hole through which the pin penetrates.

As described above, the steering device of the present disclosure includes the liner slot provided with a through-hole through which a pin penetrates, and the liner slot is inserted into a column long hole to restrict the movement in the axial direction. Accordingly, when the liner slot is inserted into the column long hole, the axial movement of the pin is limited, so that the specification not having the telescopic mechanism can be obtained. In addition, in a case where another liner slot having an opening portion extending long along the axial direction is inserted into the column long hole, since the axial movement of the pin is enabled, the specification having the telescopic mechanism can be obtained. As described above, with the steering device having the same structure, by replacing the liner slot with another liner slot, it is possible to selectively use the specification having the telescopic mechanism and the specification not having the telescopic mechanism. As described above, it is possible to share components by making the steering device having the telescopic mechanism and the steering device not having the telescopic mechanism have the same structure.

As a preferable embodiment of the steering device, the liner slot includes a protrusion protruding from an outer surface facing an inner peripheral surface of the column long hole and pressed against the inner peripheral surface of the column long hole. Accordingly, it is possible to suppress rattling of the liner slot with respect to an attachment portion in a state where the liner slot is inserted into the column long hole.

As a preferable embodiment of the steering device, the protrusion is provided at a position different from the through-hole in the axial direction. To suppress rattling of the liner slot with respect to the attachment portion, it is preferable that the protrusion is provided at the position away from the through-hole in the axial direction. That is, rattling of the liner slot can be further suppressed in a case where the position of a protrusion is set to a position different from the position of a through-hole in the axial direction than in a case where the position of the protrusion is set to a position overlapping the position of the through-hole in the axial direction.

As a preferable embodiment of the steering device, the liner slot is provided with a through-hole penetrating in the vehicle width direction and extending in the axial direction, or is provided with a recessed portion recessed in the vehicle width direction and extending in the axial direction, and the through-hole or the recessed portion overlaps the protrusion when viewed in an intersecting direction intersecting the axial direction and the vehicle width direction, and is provided at a position closer to the protrusion than to a first straight line extending in the axial direction through a center of the through-hole. A thin wall portion is formed at a portion closer to the protrusion with respect to the first straight line within the portion of the liner slot. Accordingly, when the protrusion is pressed from the inner peripheral surface of the column long hole, the thin wall portion is elastically deformed, and the pressing force of the protrusion against the inner peripheral surface of the column long hole becomes larger. Thus, rattling of the liner slot can be further suppressed.

As a preferable embodiment of the steering device, a surface of the protrusion has an inclined surface that approaches the outer surface toward a center in the vehicle width direction. Accordingly, since an inclined surface has a guide function, the liner slot is easily inserted into the column long hole, and assembling workability of the liner slot is further improved.

As a preferable embodiment of the steering device, the liner slot includes a first portion located on one side in an axial direction with respect to the through-hole and a second portion located on an other side in an axial direction with respect to the through-hole, and the first portion is provided with the protrusion on one side in the intersecting direction with respect to the first straight line, and the second portion is provided with the protrusion on an other side in the intersecting direction with respect to the first straight line. When both of the protrusion of the first portion and the protrusion of the second portion are provided on one side in the intersecting direction, both of the thin wall portion of the first portion and the thin wall portion of the second portion are provided on one side in the intersecting direction. Thus, within the portion of the liner slot, the rigidity of a portion on one side in an intersecting direction with respect to a first straight line is lower than the rigidity of a portion on the other side in the intersecting direction with respect to the first straight line, so that the pressing force of the protrusion against the inner peripheral surface of the column long hole is reduced. Accordingly, by disposing the protrusion of a first portion and the protrusion of a second portion opposite in the intersecting direction with respect to the first straight line, it is possible to further increase the pressing force of the protrusions against the inner peripheral surface of the column long hole.

As a preferable embodiment of the steering device, the liner slot includes a first portion located on one side with respect to the through-hole in an axial direction and a second portion located on an other side with respect to the through-hole in an axial direction, and the first portion is provided with the protrusion on an other side in the intersecting direction with respect to the first straight line, and the second portion is provided with the protrusion on one side in the intersecting direction with respect to the first straight line. Also in this case, similarly to the above, by making the positions in the intersecting direction where the protrusions are provided opposite to each other between the first portion and the second portion, it is possible to further increase the pressing force of the protrusions against the inner peripheral surface of the column long hole.

A liner slot of a steering device according to an embodiment of the present disclosure, the liner slot being capable of being inserted into a column long hole of an attachment portion provided on an upper column extending in an axial direction and inserted into the column long hole to restrict movement in the axial direction, the liner slot comprising: a through-hole through which a pin penetrating through a side plate portion of a column bracket attached to a vehicle body and extending along a vehicle width direction is capable of penetrating. In this way, it is possible to share components by making the steering device having the telescopic mechanism and the steering device not having the telescopic mechanism have the same structure.

Advantageous Effects of Invention

According to the present disclosure, it is possible to provide a steering device, the steering device having the same structure, that can be used separately for the specification having the telescopic mechanism and the specification not having the telescopic mechanism, and a liner slot of the steering device.

DESCRIPTION OF EMBODIMENTS

Hereinafter, the present invention will be described in detail with reference to the drawings. Note that the present invention is not limited by a mode for carrying out the invention described below (hereinafter, referred to as an embodiment). In addition, constituent elements in the embodiment described below include those that can be easily assumed by those skilled in the art, those that are substantially the same, and those within a so-called equivalent range. Further, the constituent elements disclosed in the embodiment described below can be appropriately combined. Note that, in the description described below, a direction along a rotation axis of a steering shaft is referred to as an axial direction, and a direction intersecting the rotation axis (for example, a direction orthogonal to the rotation axis) is referred to as a radial direction. In addition, the front side in the vehicle body is denoted by FR, the rear side in the vehicle body is denoted by RR, the right side in the vehicle body is denoted by RH, and the left side in the vehicle body is denoted by LH. Further, the width direction of the vehicle body is referred to as a vehicle width direction.

First Embodiment

Figure 1:
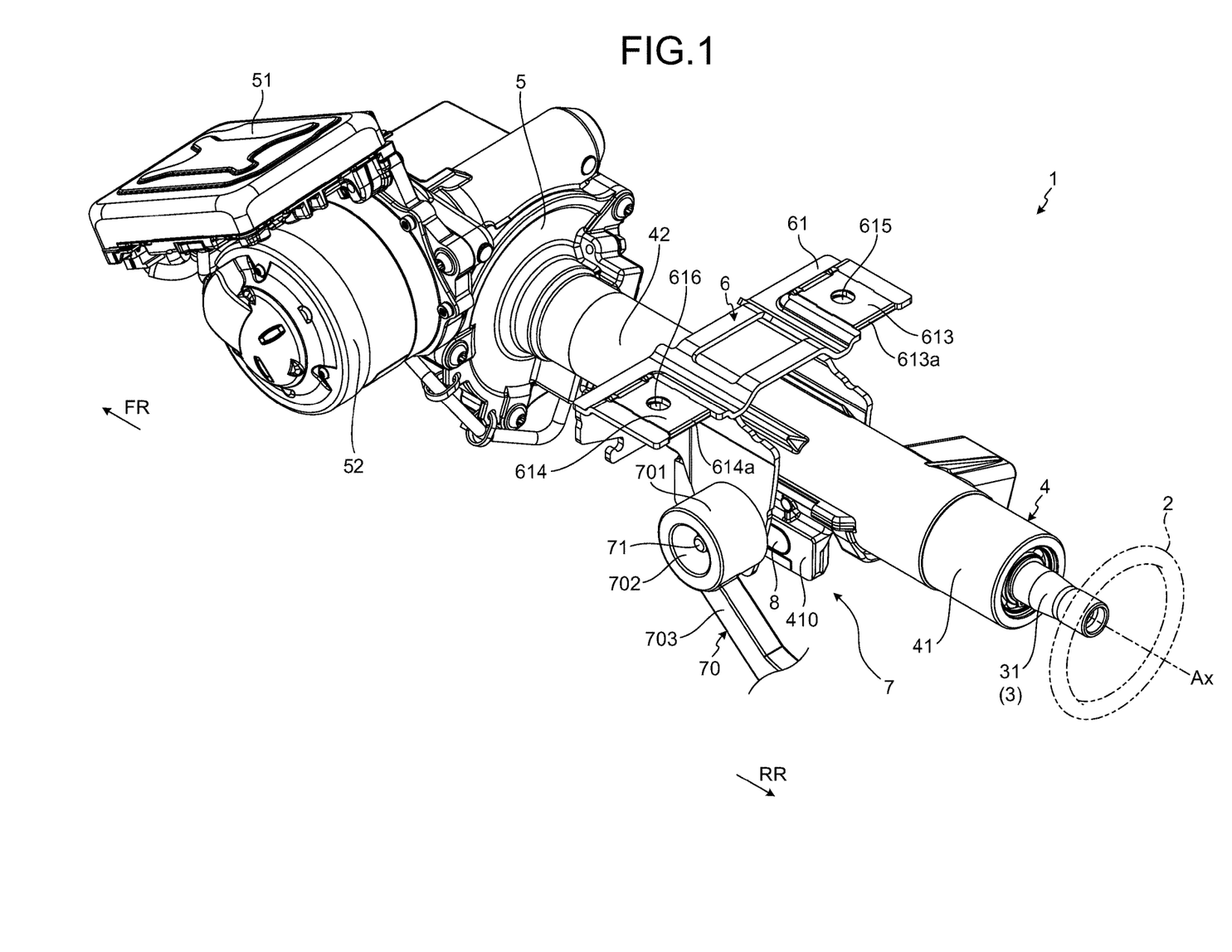
FIG. 1 is a perspective diagram of a steering device according to a first embodiment.
Figure 2:
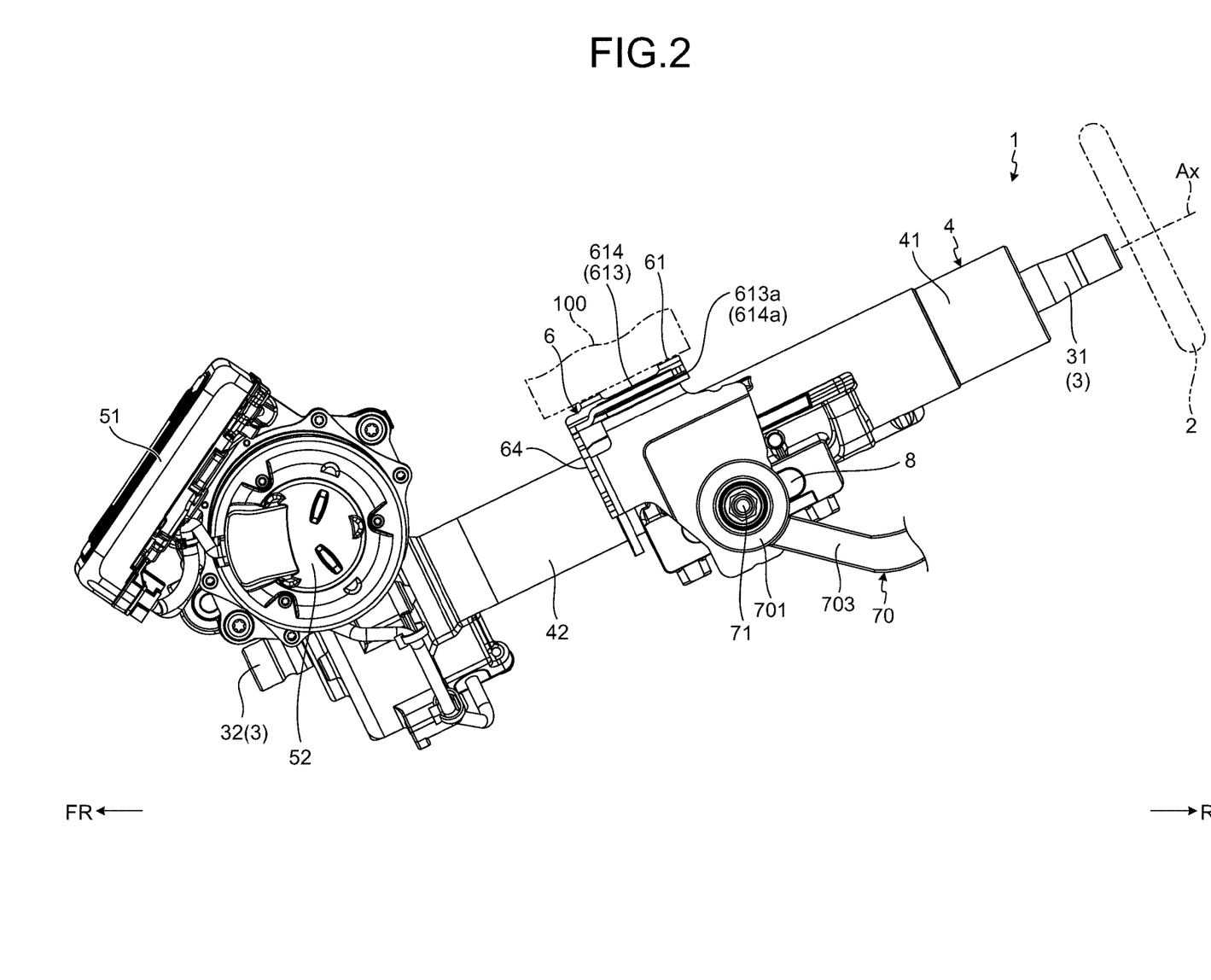
FIG. 2 is a side diagram of the steering device according to the first embodiment.
Figure 3:
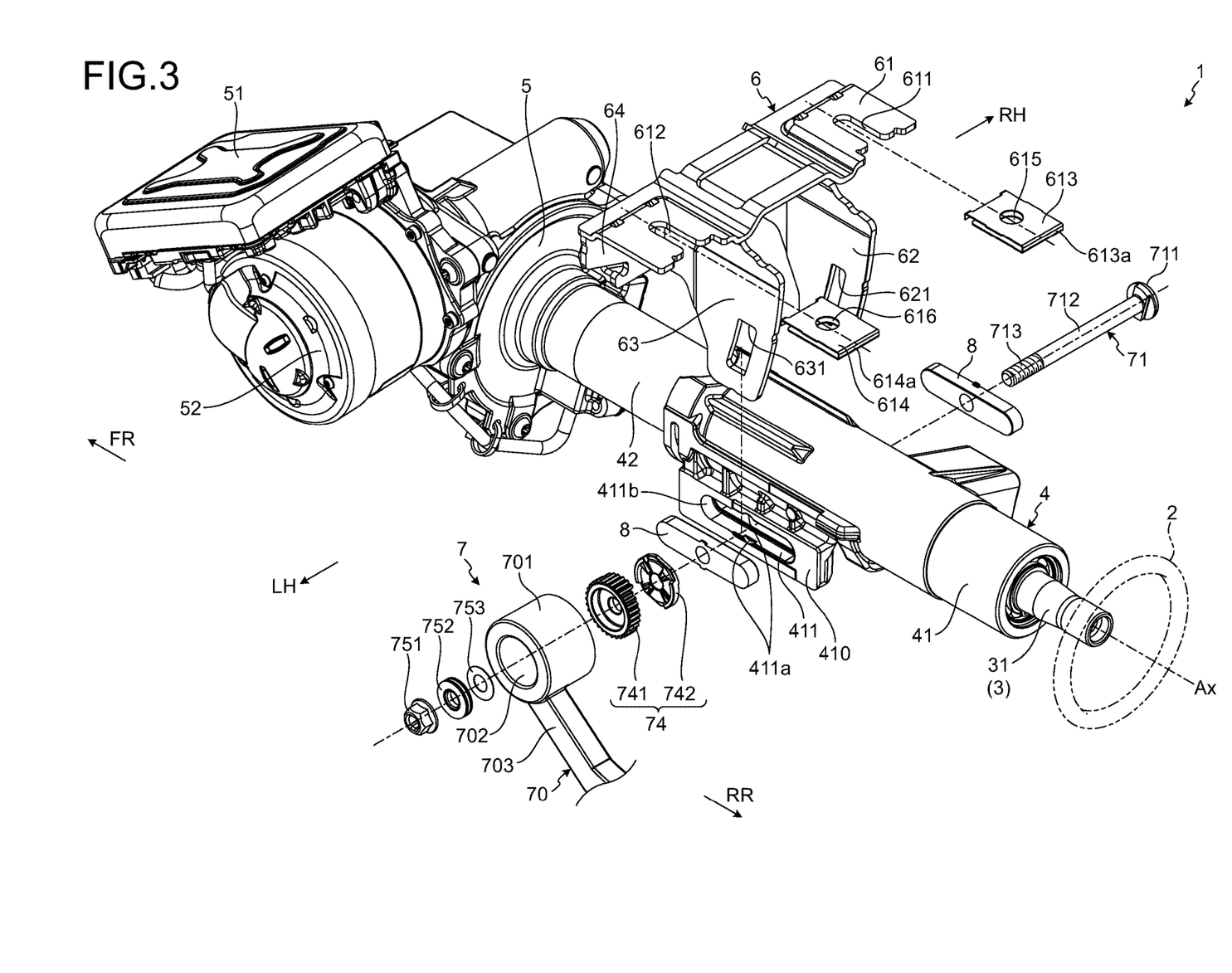
FIG. 3 is an exploded perspective diagram of the steering device of FIG. 1.
Figure 4:
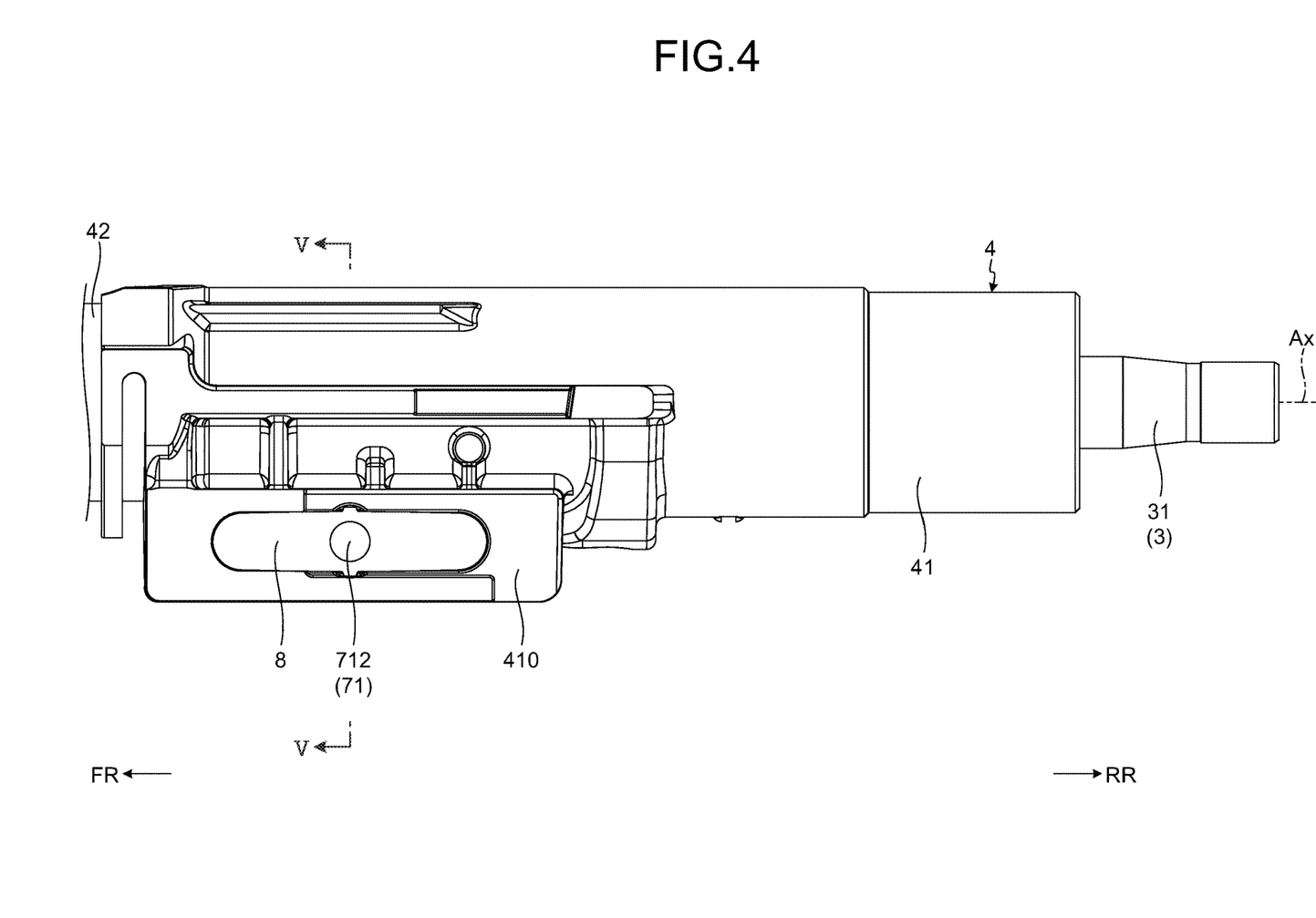
FIG. 4 is a side diagram of a part of the steering device of FIG. 2.
Figure 5:
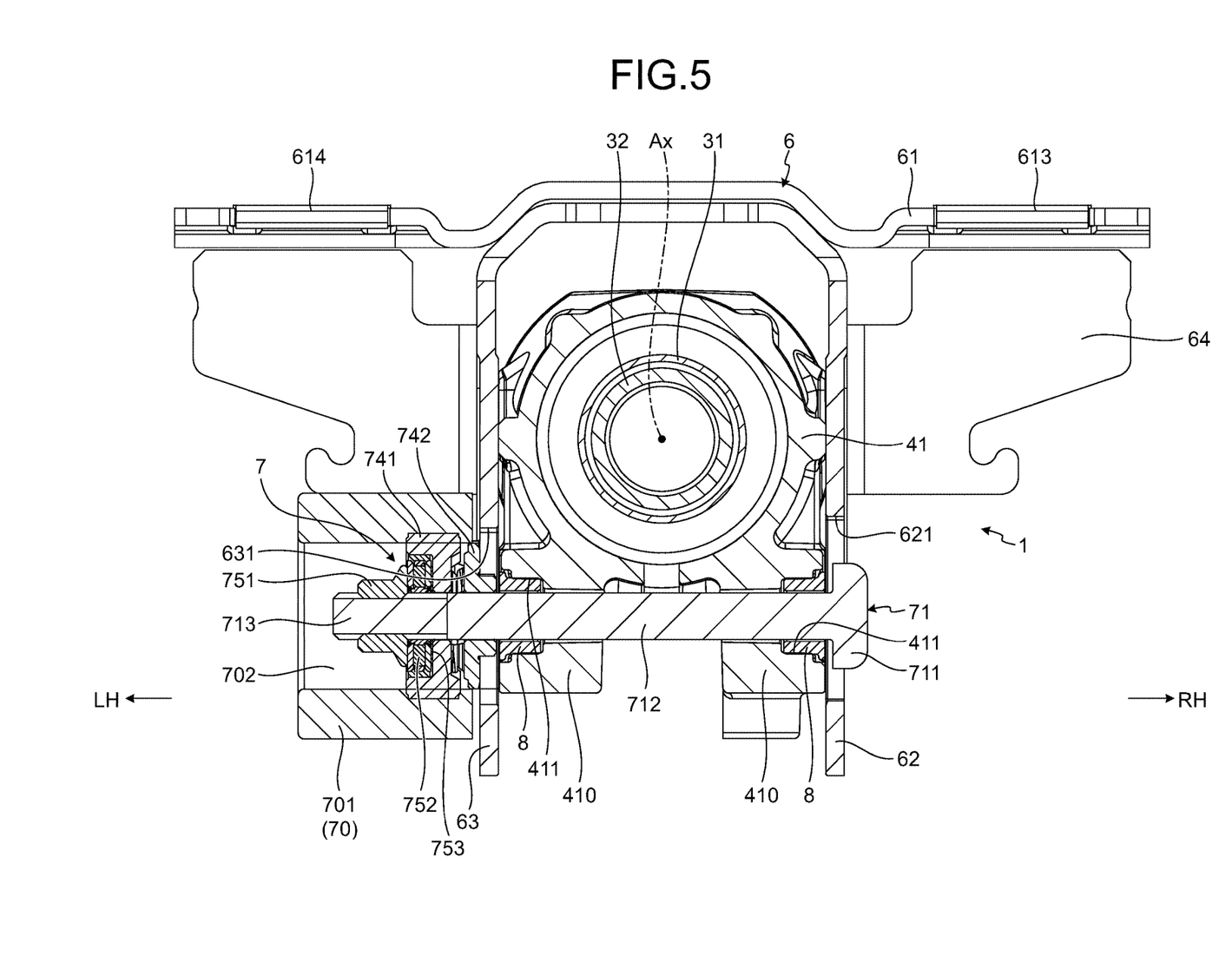
FIG. 5 is a cross-sectional diagram taken along line V-V of FIG. 4.

FIG. 1 is a perspective diagram of a steering device according to a first embodiment. FIG. 2 is a side diagram of the steering device according to the first embodiment. FIG. 3 is an exploded perspective diagram of the steering device of FIG. 1. FIG. 4 is a side diagram of a part of the steering device of FIG. 2. FIG. 5 is a cross-sectional diagram taken along line V-V of FIG. 4.

First, a basic configuration of a steering device 1 will be described. As illustrated in FIGS. 1 to 3, a steering device 1 includes a steering wheel 2, a steering shaft 3, a steering column 4, a gear box 5, a column bracket 6, and a fastening mechanism 7.

As illustrated in FIGS. 1 to 3, the steering wheel 2 is coupled to a rear end portion of the steering shaft 3. Then, when the driver operates the steering wheel 2, the steering shaft 3 rotates about the rotation axis Ax, and an operation torque is applied to the steering shaft 3.

The gear box 5 is provided at a front end portion of the steering shaft 3. An ECU 51 and an electric motor 52 are assembled to the gear box 5. The ECU 51 controls the operation of the electric motor 52. An assist torque is applied to the steering shaft 3 by the ECU 51 and the electric motor 52. That is, the steering device 1 of the present embodiment is an electric power steering device that assists the driver's steering with the electric motor 52.

As illustrated in FIGS. 1 to 3, the steering shaft 3 includes an upper shaft 31 and a lower shaft 32. The upper shaft 31 and the lower shaft 32 are cylindrical shafts. The upper shaft (input shaft) 31 and the lower shaft (output shaft) 32 illustrated in FIG. 2 extend in the axial direction and are formed in a cylindrical shape along the direction around the rotation axis Ax. The steering wheel 2 is coupled to a rear end portion of the upper shaft 31. A front end portion of the upper shaft 31 is externally fitted to the lower shaft 32. Specifically, the front end portion of the upper shaft 31 and a rear end portion of the lower shaft 32 are spline-fitted. Hence, the upper shaft 31 is slidable in the axial direction with respect to the lower shaft 32. In other words, the steering shaft 3 is extendable and retractable. Note that the upper shaft 31 is also referred to as an input shaft, and the lower shaft 32 is also referred to as an output shaft.

As illustrated in FIG. 3, the steering column 4 is an outer cylinder extending in the axial direction and disposed on the outer peripheral side of the steering shaft 3. The steering column 4 includes an upper column 41 and a lower column 42. The upper column 41 rotatably supports the upper shaft (input shaft) 31. The upper column 41 is disposed near the steering wheel 2 (that is, a rear side of the vehicle body). The lower column 42 is disposed on the opposite side (that is, a front side of the vehicle body) of the steering wheel 2 with respect to the upper column 41. The lower column 42 rotatably supports the lower shaft (output shaft) 32. The upper column 41 and the lower column 42 have a cylindrical shape and are relatively movable in the axial direction.

As illustrated in FIG. 3, the column bracket 6 is provided on the outer peripheral side of the steering column 4. The column bracket 6 includes a top plate portion 61, a pair of side plate portions 62 and 63, and a vertical plate 64. As illustrated in FIG. 3, the top plate portion 61 extends along a left-right direction. A notch 611 is provided at a right end portion of the top plate portion 61. The notch 611 extends long along parallel to the axial direction (that is, in a front-rear direction of the vehicle body). The notch 611 has an open end at a rear side end portion of the vehicle body. A detachment capsule 613 is provided at a right end portion of the top plate portion 61. In other words, the detachment capsule 613 sandwiches the right end portion of the top plate portion 61 from above and below so as to cover the notch 611. The detachment capsule 613 is a plate-shaped member obtained by bending two plate members at a rear end 613a. The detachment capsule 613 has a through-hole 615 having a circular shape. In a state where the detachment capsule 613 is fitted to the right end portion of the top plate portion 61, the through-hole 615 overlaps the notch 611. Accordingly, a fixing pin (not illustrated) fixed to a vehicle body 100 illustrated in FIG. 2 holds the detachment capsule 613 in a state of penetrating the through-hole 615 and the notch 611. In addition, the side plate portion 62 extends downward from a lower surface of the top plate portion 61. The side plate portion 62 is located on the left side of the notch 611. The side plate portion 62 is provided with a tilt long hole 621. The tilt long hole 621 is a long hole extending along an up-down direction. Note that the vertical plate 64 extends downward from a front end of the top plate portion 61.

As illustrated in FIG. 3, a notch 612 is provided at a left end portion of the top plate portion 61. The notch 612 extends long along parallel to the axial direction (that is, in the front-rear direction of the vehicle body). The notch 612 has an open end at a rear side end portion of the vehicle body. A detachment capsule 614 is provided at a left end portion of the top plate portion 61. In other words, the detachment capsule 614 sandwiches the left end portion of the top plate portion 61 from above and below so as to cover the notch 612. The detachment capsule 614 is a plate-shaped member obtained by bending two plate members at a rear end 614a. The detachment capsule 614 has a through-hole 616 having a circular shape. In a state where the detachment capsule 614 is fitted to the left end portion of the top plate portion 61, the through-hole 616 overlaps the notch 612. Accordingly, a fixing pin (not illustrated) fixed to the vehicle body 100 illustrated in FIG. 2 holds the detachment capsule 614 in a state of penetrating the through-hole 616 and the notch 612. In addition, the side plate portion 63 extends downward from the lower surface of the top plate portion 61. The side plate portion 63 is located on the right side of the notch 612. The side plate portion 63 is provided with a tilt long hole 631. The tilt long hole 631 is a long hole extending along the up-down direction. Thus, the steering device 1 is fixed to the vehicle body 100 via the detachment capsules 613 and 614, the top plate portion 61, and the fixing pins, which are not illustrated. As described above, the column bracket 6 includes the side plate portions 62 and 63 located on the sides of the upper column 41.

As illustrated in FIGS. 3 to 5, the steering device 1 includes the fastening mechanism 7. The fastening mechanism 7 includes an operation lever 70, a pin 71, liner slots 8, a cam 74, and attachment portions 410.

The pin 71 includes a head portion 711, a shaft portion 712, and a screw portion 713. The outer periphery of the shaft portion 712 is smooth, and a male screw is formed on the outer periphery of the screw portion 713. The pin 71 extends along the left-right direction as described below. That is, the pin 71 extends along the vehicle width direction and is provided to penetrate the side plate portions 62 and 63, the pair of liner slots 8, the cam 74, the operation lever 70, a nut 751, a thrust bearing 752, and a washer 753.

In the first embodiment, one liner slot 8 is provided on each of the left and right sides of the upper column 41. Specifically, a pair of attachment portions 410 is provided downward on both left and right sides of the upper column 41, and the liner slots 8 are fitted to the attachment portions 410. The attachment portion 410 has a rectangular shape extending in the front-rear direction when viewed from the side. The attachment portion 410 is provided with a column long hole 411 extending along the axial direction. The column long hole 411 penetrates the attachment portion 410 in the left-right direction. The liner slot 8 is fitted to an inner peripheral surface 411b of the column long hole 411 of the attachment portion 410. In other words, the liner slot 8 is detachably provided in the column long hole 411 of the attachment portion 410. Recesses 411a are provided on the inner peripheral surface 411b of the column long hole 411. The structure of the liner slot 8 will be described below in detail.

The operation lever 70 includes a base portion 701 and a lever portion 703. The base portion 701 is a cylindrical body, and an insertion hole 702 is provided to penetrate in the left-right direction. The lever portion 703 is fixed to an outer peripheral surface of the base portion 701. When the lever portion 703 is pushed downward, the base portion 701 rotates.

Here, as illustrated in FIG. 5, a rotation cam 741 is fitted to an inner peripheral surface of the insertion hole 702 of the base portion 701. Specifically, a tooth portion is formed on the outer periphery of the rotation cam 741, and an uneven portion is formed on the inner peripheral surface of the insertion hole 702. The tooth portion of the rotation cam 741 meshes with the uneven portion of the insertion hole 702. Accordingly, the base portion 701 and the rotation cam 741 rotate integrally. In addition, since a fixed cam 742 does not rotate, the rotation cam 741 and the fixed cam 742 can relatively rotate. Then, the shaft portion 712 of the pin 71 penetrates through the tilt long hole 621 of the side plate portion 62 of the column bracket 6, the liner slots 8, the tilt long hole 631 of the side plate portion 63, the fixed cam 742, the rotation cam 741, the thrust bearing 752, and the washer 753. In addition, the screw portion 713 provided at a tip portion of the shaft portion 712 meshes with the nut 751, so that the screw portion 713 is fastened to the nut 751. Thus, when the operation lever 70 is rotated downward to change the up-down position of the steering column 4 with respect to the column bracket 6, the pin 71 moves up and down inside the tilt long hole 621 of the side plate portion 62 and the tilt long hole 631 of the side plate portion 63. Then, when the operation lever 70 is rotated upward after the appropriate height position is reached, the rotation cam 741 rotates with respect to the fixed cam 742, so that the up-down position of the steering column 4 with respect to the column bracket 6 is fixed.

Figure 6:
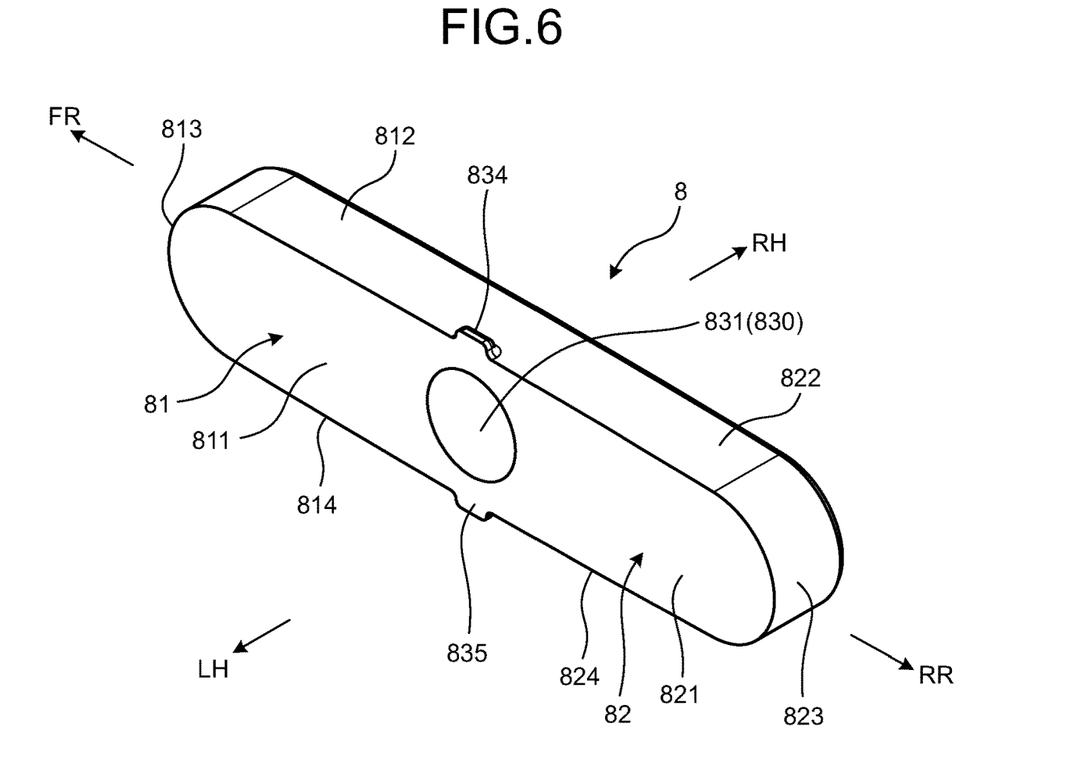
FIG. 6 is a perspective diagram of a liner slot according to the first embodiment.
Figure 7:
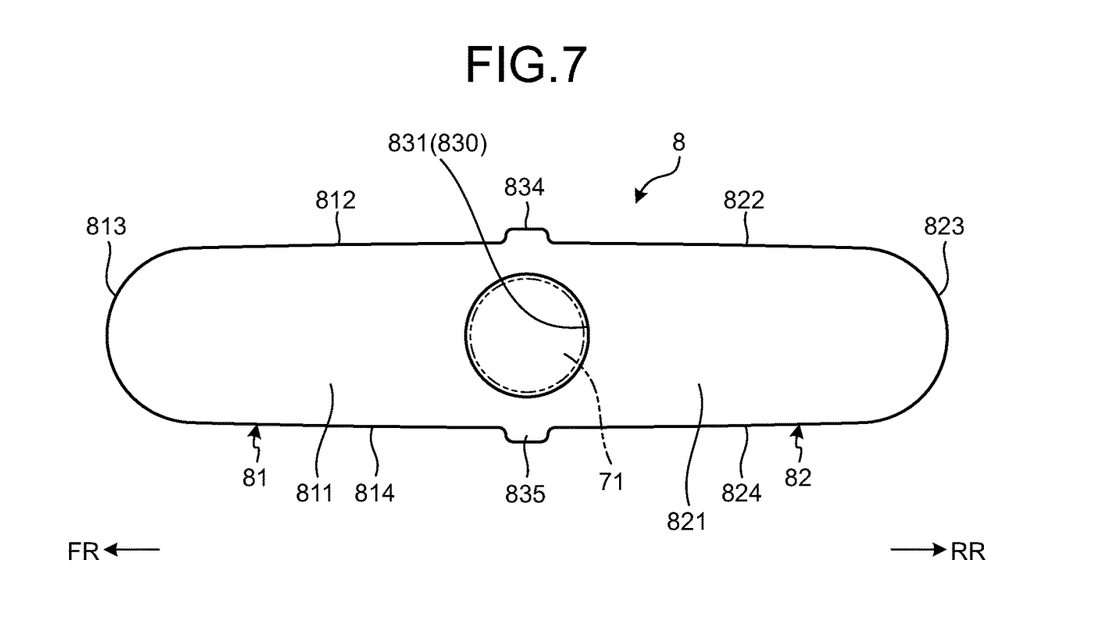
FIG. 7 is a side diagram of FIG. 6.
Figure 8:
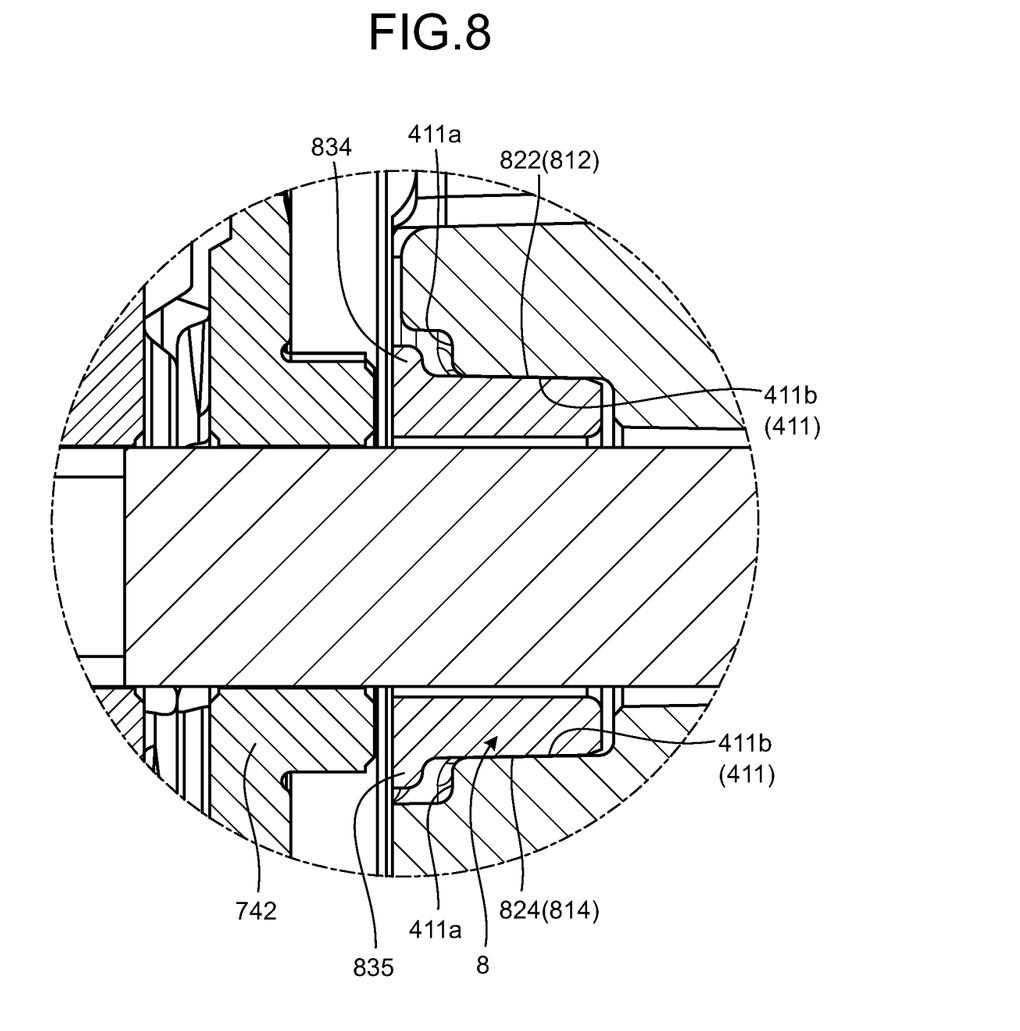
FIG. 8 is an enlarged cross-sectional diagram illustrating a state in which the liner slot of the first embodiment is fitted to an attachment portion of an upper column.
Figure 9:
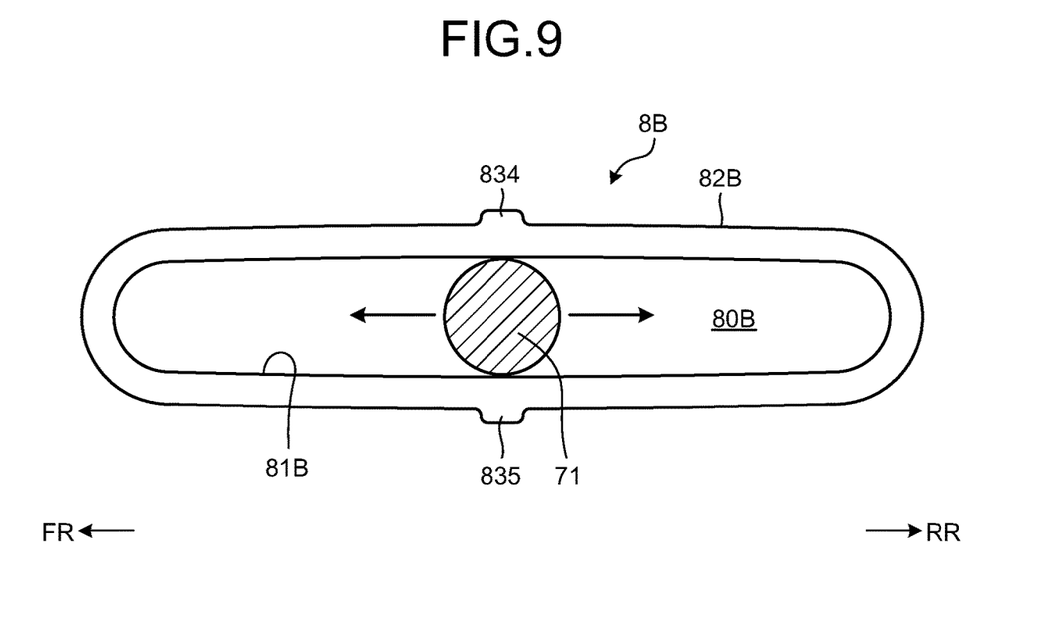
FIG. 9 is a side diagram of a liner slot according to a reference example.

Next, the structure of the liner slot 8 will be described. FIG. 6 is a perspective diagram of a liner slot according to the first embodiment. FIG. 7 is a side diagram of FIG. 6. FIG. 8 is an enlarged cross-sectional diagram illustrating a state in which the liner slot of the first embodiment is fitted to an attachment portion of an upper column. FIG. 9 is a side diagram of a liner slot according to a reference example.

As illustrated in FIGS. 6 and 7, the liner slot 8 is a bracket extending long in the axial direction (front-rear direction). Note that although the liner slot 8 illustrated in FIGS. 6 and 7 is disposed on the left side of the vehicle body, the liner slot 8 disposed on the right side of the vehicle body also has the same structure.

The liner slot 8 has a shape extending in the front-rear direction (axial direction, longitudinal direction), and is detachably provided in the column long hole 411 of the attachment portion 410. The liner slot 8 includes a first portion 81 on the front side and a second portion 82 on the rear side. The first portion 81 is a portion disposed on the front side of a through-hole 830. The second portion 82 is a portion disposed on the rear side of the through-hole 830. A left side surface 811 of the first portion 81 is flat. In addition, an upper surface (outer surface) 812 and a lower surface (outer surface) 814 of the first portion 81 are also flat. As illustrated in FIG. 8, the upper surface 812 and the lower surface 814 are outer surfaces facing the inner peripheral surface 411b of the column long hole 411. A front end surface 813 has an arc shape when viewed from the side. Specifically, the front end surface 813 has an arc shape protruding forward. A left side surface 821 of the second portion 82 is flat. In addition, an upper surface 822 and a lower surface 824 of the second portion 82 are also flat. As illustrated in FIG. 8, the upper surface 822 and the lower surface 824 are outer surfaces facing the inner peripheral surface 411b of the column long hole 411. A rear end surface 823 has an arc shape when viewed from the side. Specifically, the rear end surface 823 has an arc shape protruding rearward. The through-hole 830 is provided at the center of the liner slot 8 in the front-rear direction. The through-hole 830 penetrates the liner slot 8 in the left-right direction. The through-hole 830 has a circular shape when viewed in the left-right direction. That is, an inner peripheral surface 831 of the through-hole 830 is a cylindrical surface. The shaft portion 712 of the pin 71 penetrates through the through-hole 830. In a state where the shaft portion 712 of the pin 71 penetrates through the through-hole 830, movement of the pin 71 in the front-rear direction is limited. In addition, protruding portions 834 and 835 are provided at the center of the liner slot 8 in the front-rear direction. The protruding portion 834 is located at a left end portion of the liner slot 8 and protrudes upward. The protruding portion 835 is located at the left end portion and protrudes downward.

As illustrated in FIG. 8, in a state where the liner slot 8 is inserted into the inner peripheral surface 411b of the column long hole 411, the upper surface (outer surface) 812 and the lower surface (outer surface) 814 are disposed to face the inner peripheral surface 411b, and the protruding portions 834 and 835 are fitted into the recesses 411a of the column long hole 411.

As illustrated in FIG. 9, a liner slot 8B according to a reference example is a bracket extending long in the axial direction (front-rear direction). The liner slot 8B having the same structure can be applied in the case of being used on the left side of the vehicle body and in the case of being used on the right side. The liner slot 8B extends in the front-rear direction (axial direction, longitudinal direction), and is detachably provided in a column long hole 411 of an attachment portion 410. Hereinafter, the liner slot 8B of the reference example will be described, but a portion different from the liner slot 8 of the embodiment will be mainly described. The liner slot 8B of the reference example is a frame-shaped member extending in the front-rear direction (axial direction, longitudinal direction). Accordingly, the liner slot 8B of the reference example is provided with an opening portion 80B. The opening portion 80B extends in the front-rear direction (axial direction, longitudinal direction). An inner peripheral surface 81B of the opening portion 80B has a function of guiding a pin 71. An outer surface 82B of the liner slot 8B of the reference example faces an inner peripheral surface 411b of the column long hole 411. The outer surface 82B annularly extends along the inner peripheral surface 81B when viewed in the vehicle width direction (left-right direction). As described above, when the liner slot 8B of the reference example is inserted into the column long hole 411 of the attachment portion 410, the pin 71 can move in the opening portion 80B in the front-rear direction (axial direction, longitudinal direction) as indicated by the arrows, and the operation of the telescopic mechanism becomes effective.

As described above, the steering device 1 according to the first embodiment includes the liner slots 8 that are inserted into the column long holes 411 of the attachment portions 410 to restrict the axial movement, and the pin 71 that extends along the vehicle width direction and penetrates the liner slots 8, and the liner slots 8 are provided with the through-holes 830 through which the pin 71 penetrates.

As described above, the steering device 1 of the present disclosure includes the liner slots 8 provided with the through-holes 830 through which the pin 71 penetrates, and the liner slots 8 are inserted into the column long holes 411 to restrict the axial movement. Accordingly, when the liner slots 8 are inserted into the column long holes 411, the axial movement of the pin 71 is limited, so that the specification not having the telescopic mechanism can be obtained. In addition, when the liner slots 8B according to the reference example are inserted into the column long holes 411, the axial movement of the pin 71 is enabled, so that the specification having the telescopic mechanism can be obtained. As described above, with the steering device 1 having the same structure, by replacing the liner slots 8B of the reference example with the liner slots 8 of the embodiment, it is possible to selectively use the specification having the telescopic mechanism and the specification not having the telescopic mechanism. That is, when the liner slots 8B of the reference example are used, the specification having the telescopic mechanism is obtained, and when the liner slots 8 of the embodiment are used, the specification not having the telescopic mechanism is obtained. As described above, it is possible to share components by making the steering device having the telescopic mechanism and the steering device not having the telescopic mechanism have the same structure.

Second Embodiment

Figure 10:
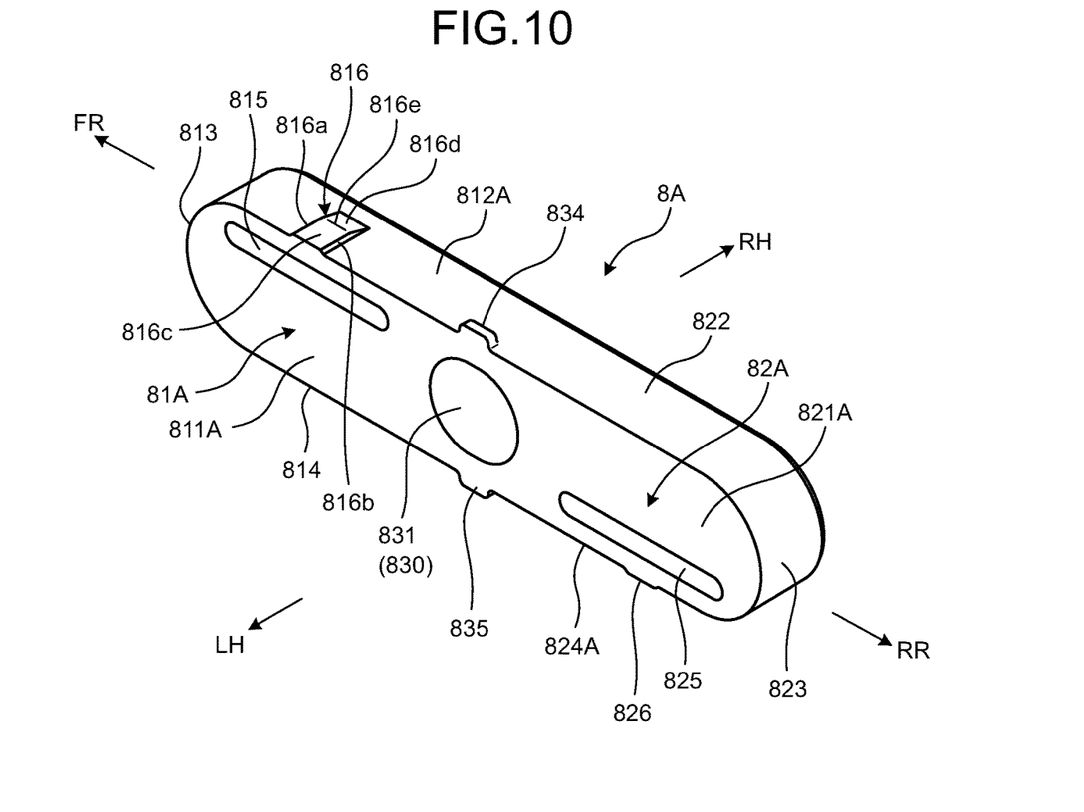
FIG. 10 is a perspective diagram of a liner slot according to a second embodiment.
Figure 11:
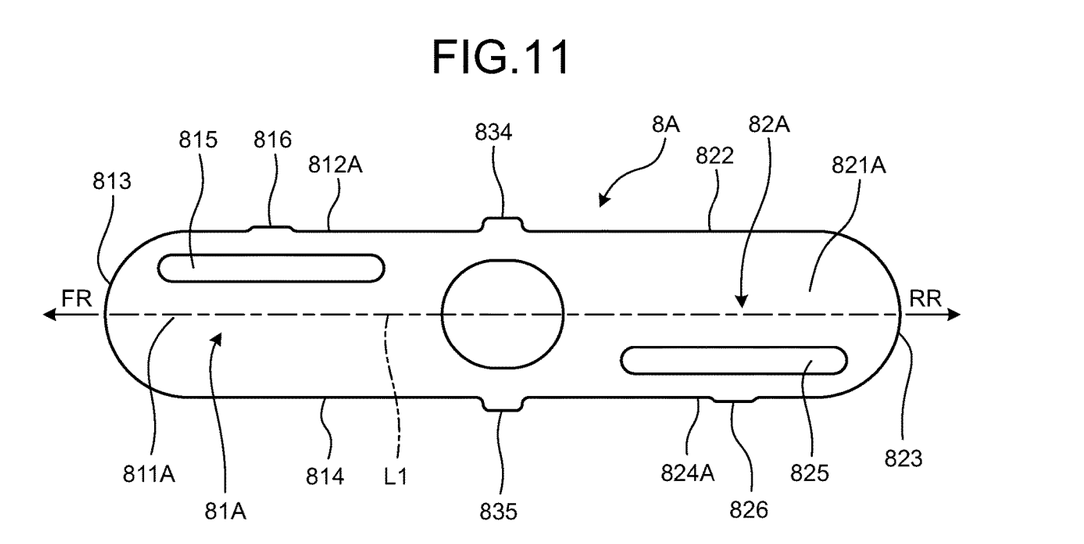
FIG. 11 is a side diagram of FIG. 10.
Figure 12:
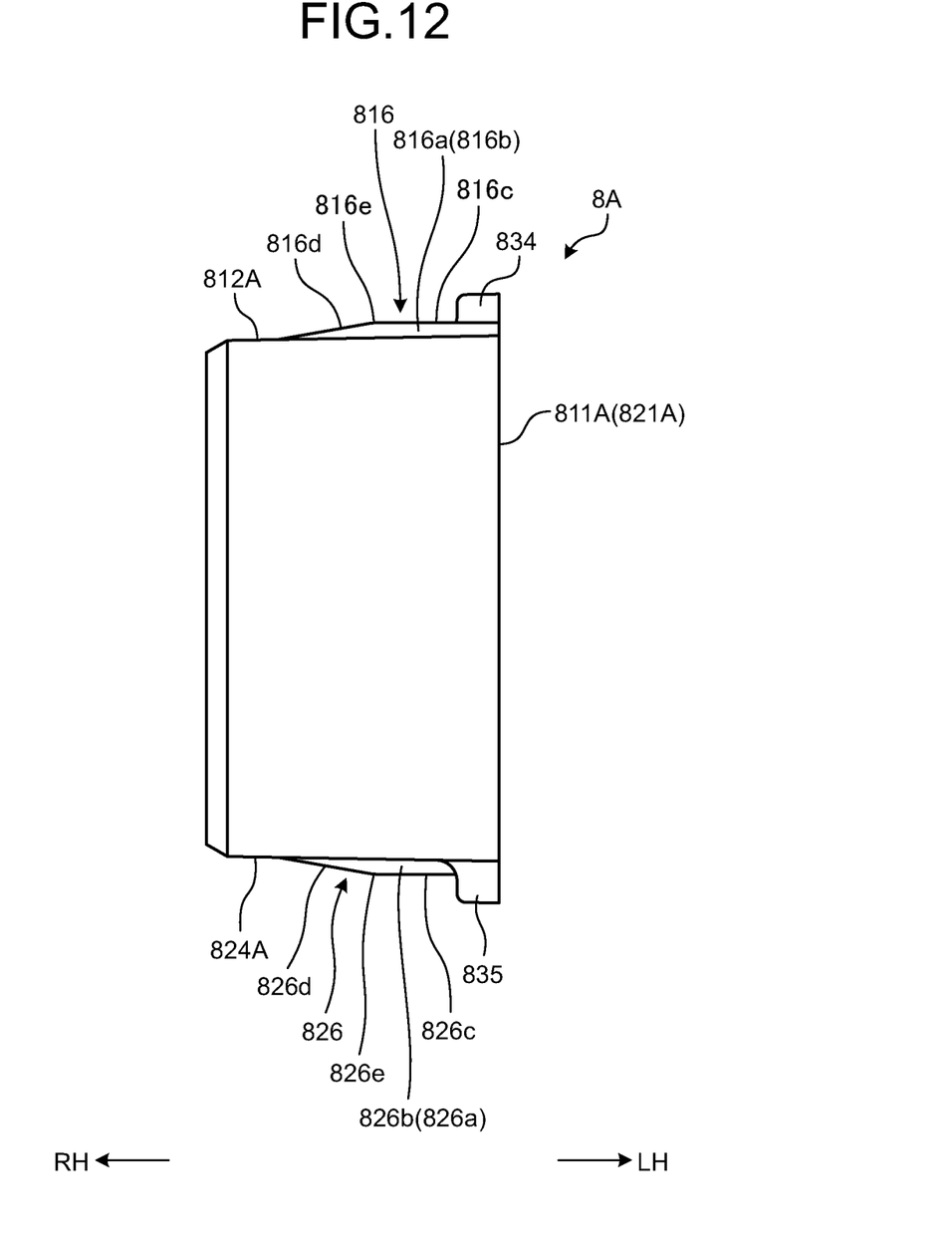
FIG. 12 is a diagram of the liner slot according to the second embodiment when viewed from the front side.

Next, a liner slot according to a second embodiment will be described. FIG. 10 is a perspective diagram of a liner slot according to a second embodiment. FIG. 11 is a side diagram of FIG. 10. FIG. 12 is a diagram of the liner slot according to the second embodiment when viewed from the front side.

As illustrated in FIGS. 10 to 12, a liner slot 8A according to the second embodiment is a bracket extending long in the axial direction (front-rear direction). Note that although the liner slot 8A is disposed on the left side of the vehicle body, the liner slot 8A disposed on the right side of the vehicle body also has the same structure.

As illustrated in FIGS. 10 and 11, the liner slot 8A has a shape extending in the longitudinal direction, and is detachably provided in a column long hole 411 of an attachment portion 410. The liner slot 8A includes a first portion 81A on the front side and a second portion 82A on the rear side. A through-hole 830 is provided at the center of the liner slot 8A in the front-rear direction. The first portion 81A is a portion on the front side of the through-hole 830. The second portion 82A is a portion on the rear side of the through-hole 830. Note that as illustrated in FIG. 11, a first straight line L1 extending in the front-rear direction (axial direction) through the center of the through-hole 830 is set.

In the first portion 81A, a front end surface 813 has an arc shape when viewed from the side. Specifically, the front end surface 813 has an arc shape protruding forward. In addition, an upper surface 812A of the first portion 81A has a protrusion 816. The upper surface 812A is an outer surface facing an inner peripheral surface 411b of the column long hole 411. A side surface 811A of the first portion 81A is flat. As illustrated in FIGS. 10 and 12, the protrusion 816 protrudes upward from the upper surface 812A. The protrusion 816 has a rectangular shape when viewed from above. Specifically, the protrusion 816 has a front surface portion 816a, a rear surface portion 816b, a top surface portion 816c, and an inclined surface portion 816d. The front surface portion 816a is a flat surface extending in the left-right direction and the up-down direction. The rear surface portion 816b is a flat surface extending in the left-right direction and the up-down direction. The front surface portion 816a and the rear surface portion 816b extend substantially parallel to each other. The front surface portion 816a and the rear surface portion 816b have substantially the same shape. The top surface portion 816c has a rectangular shape when viewed from above. The top surface portion 816c extends substantially parallel to the upper surface 812A. The top surface portion 816c is positioned above the upper surface 812A. The inclined surface portion 816d has a rectangular shape when viewed from above. The inclined surface portion 816d is adjacent to the top surface portion 816c in the left-right direction. That is, it extends rightward from a right end 816e of the top surface portion 816c. In detail, the inclined surface portion 816d is an inclined surface directed downward (toward a through-hole 815 side) toward the right side (toward the center in the vehicle width direction). Further, as illustrated in FIGS. 10 and 11, the through-hole 815 is provided in the first portion 81A. The through-hole 815 is a lightening portion in resin molding and penetrates the first portion 81A in the left-right direction. The through-hole 815 extends long in the front-rear direction. A front-rear length of the through-hole 815 is longer than a front-rear length of the protrusion 816. When the liner slot 8A is viewed from the upper side (intersecting direction intersecting the axial direction and the vehicle width direction), the through-hole 815 overlaps the protrusion 816 in an up-down direction. As illustrated in FIG. 11, the position of the protrusion 816 in the front-rear direction is, for example, the center of the through-hole 815 in the front-rear direction. However, in the present invention, the position of the through-hole 815 in the front-rear direction is not limited to the center of the through-hole 815 in the front-rear direction.

In the second portion 82A, a rear end surface 823 has an arc shape when viewed from the side. Specifically, the rear end surface 823 has an arc shape protruding rearward. In addition, a lower surface 824A of the second portion 82A has a protrusion 826. The lower surface 824A is an outer surface facing the inner peripheral surface 411b of the column long hole 411. A side surface 821A of the second portion 82A is flat. The protrusion 826 has the same shape as the protrusion 816 described above. The protrusion 826 has a rectangular shape when viewed from below. In detail, as illustrated in FIG. 12, the protrusion 826 protrudes downward from the lower surface 824A. Specifically, the protrusion 826 has a front surface portion 826a, a rear surface portion 826b, a top surface portion 826c, and an inclined surface portion 826d. The front surface portion 826a is a flat surface extending in the left-right direction and the up-down direction. The rear surface portion 826b is a flat surface extending in the left-right direction and the up-down direction. The front surface portion 826a and the rear surface portion 826b extend substantially parallel to each other. The front surface portion 826a and the rear surface portion 826b have substantially the same shape. The top surface portion 826c has a rectangular shape when viewed from below. The top surface portion 826c extends substantially parallel to the lower surface 824A. The top surface portion 826c is positioned below the lower surface 824A. The inclined surface portion 826d has a rectangular shape when viewed from below. The inclined surface portion 826d is adjacent to the top surface portion 826c in the left-right direction. That is, it extends rightward from a right end 826e of the top surface portion 826c. In detail, the inclined surface portion 826d is an inclined surface directed upward (toward a through-hole 825 side in FIG. 10) toward the right side (toward the center in the vehicle width direction).

Further, as illustrated in FIGS. 10 and 11, the through-hole 825 is provided in the second portion 82A. The through-hole 825 is a lightening portion in resin molding and penetrates the second portion 82A in the left-right direction. The through-hole 825 extends long in the front-rear direction. A front-rear length of the through-hole 825 is longer than a front-rear length of the protrusion 826. When the liner slot 8A is viewed from the upper side, the through-hole 825 overlaps the protrusion 826 in the up-down direction. As illustrated in FIG. 11, the position of the protrusion 826 in the front-rear direction is, for example, the center of the through-hole 825 in the front-rear direction. However, in the present invention, the position of the through-hole 825 in the front-rear direction is not limited to the center of the through-hole 825 in the front-rear direction.

As described above, in a steering device 1A according to the second embodiment, the liner slot 8A includes the protrusions 816 and 826 that protrude from the outer surface facing the inner peripheral surface 411b of the column long hole 411 and are pressed against the inner peripheral surface 411b of the column long hole 411. In this manner, since the protrusions 816 and 826 of the liner slot 8A are pressed from the inner peripheral surface 411b, it is possible to suppress rattling of the liner slot 8A with respect to the attachment portion 410 in a state where the liner slot 8A is inserted into the column long hole 411.

The protrusions 816 and 826 are provided at different positions in the axial direction with respect to the through-hole 830. In order to suppress rattling of the liner slot 8A with respect to the attachment portion 410, it is desirable to provide the positions of the protrusions 816 and 826 at positions axially away from the through-hole 830. That is, rattling of the liner slot 8A can be further suppressed in a case where the positions of protrusions 816 and 826 are set to positions different from the position of the through-hole 830 in the axial direction than in a case where the positions of the protrusions 816 and 826 are set to positions overlapping the position of the through-hole 830 in the axial direction.

The through-holes 815 and 825 extending in the axial direction are provided in the liner slot 8A. The through-holes 815 and 825 overlap the protrusions 816 and 826 when viewed in the up-down direction (intersecting direction), and are provided at positions closer to the protrusions 816 and 826 than to the first straight line L1. As described above, because of the through-holes 815 and 825, the portions between the surfaces of the portions of the liner slot 8A where the protrusions 816 and 826 are provided and the through-holes 815 and 825 become thin wall portions. Accordingly, when the protrusions 816 and 826 are pressed from the inner peripheral surface 411b of the column long hole 411, the thin wall portions are elastically deformed, and the pressing force of the protrusions 816 and 826 against the inner peripheral surface 411b of the column long hole 411 becomes larger. Thus, rattling of the liner slot 8A can be further suppressed.

As a desirable aspect of the steering device described above, the surfaces of the protrusions 816 and 826 have inclined surfaces that approach the outer surfaces toward the center in the vehicle width direction. Accordingly, since the inclined surface has a guide function, the liner slot is easily inserted into the column long hole 411, and assembling workability of the liner slot 8A is further improved.

The liner slot 8A includes the first portion 81A located on the front side (one side in the axial direction) of the through-hole 830 and the second portion 82A located on the rear side (the other side in the axial direction) of the through-hole 830. In the first portion 81A, the protrusion 816 is provided on the upper side (one side in the intersecting direction) of the first straight line L1, and in the second portion, the protrusion 826 is provided on the lower side (the other side in the intersecting direction) of the first straight line L1. In this manner, the positions in the up-down direction (intersecting direction) where the protrusions 816 and 826 are provided are opposite between the first portion 81A and the second portion 82A. Here, when both the protrusion 816 of the first portion 81A and the protrusion 826 of the second portion 82A are disposed on the upper side, both the thin wall portion of the first portion 81A and the thin wall portion of the second portion 82A are also on the upper side. Thus, within the portion of the liner slot 8A, the rigidity of the upper side is lower than the rigidity of the lower portion, so that the pressing force of the protrusions 816 and 826 against the inner peripheral surface 411b of the column long hole 411 is reduced. As described above, by making the up-down positions where the protrusions 816 and 826 are provided opposite to each other between the first portion 81A and the second portion 82A, it is possible to further increase the pressing force of the protrusions 816 and 826 against the inner peripheral surface 411b of the column long hole 411. Note that, even when the liner slot 8A is rotated 180 degrees about the through-hole 830, the shape of the liner slot 8A is the same as that of the liner slot 8A before rotation, so that erroneous assembly of the liner slot 8A can be reduced. Note that the present invention is not limited to the above-described embodiments, and various changes and modifications can be made on the basis of the technical idea of the present invention.

As an aspect of fixing the pin 71, the liner slots 8 and 8A of the first and second embodiments have been described. However, for example, in a liner slot having a shape extending in the longitudinal direction, a first portion on the front side and a second portion on the rear side may be formed in a frame shape, a pair of projections may be provided on the upper side and the lower side in a third portion at the center in a front-rear direction, and the pin 71 may be sandwiched between the pair of projections from above and below.

In addition, in the second embodiment, the aspect in which the through-holes 815 and 825 are provided in the liner slot 8A has been described, but the liner slot 8A may have an opening on the left side in FIG. 10 and a recessed portion that is recessed from the opening on the left side toward the right side. That is, the recessed portion is recessed in the vehicle width direction.

Further, a protrusion protruding downward from the lower surface 814 of the first portion 81A may be provided, and a protrusion protruding upward from the upper surface 822 of the second portion 82A may be provided.

REFERENCE SIGNS LIST

1 STEERING DEVICE
2 STEERING WHEEL
3 STEERING SHAFT
31 UPPER SHAFT (INPUT SHAFT)
32 LOWER SHAFT (OUTPUT SHAFT)
4 STEERING COLUMN
41 UPPER COLUMN
410 ATTACHMENT PORTION
411 COLUMN LONG HOLE
411a RECESS
411b INNER PERIPHERAL SURFACE
42 LOWER COLUMN
5 GEAR BOX
51 ECU
52 ELECTRIC MOTOR
6 COLUMN BRACKET
61 TOP PLATE PORTION
611, 612 NOTCH 613, 614 DETACHMENT CAPSULE
613a, 614a REAR END
615, 616 THROUGH-HOLE
62, 63 SIDE PLATE PORTION
621, 631 TILT LONG HOLE
64 VERTICAL PLATE
7 FASTENING MECHANISM
70 OPERATION LEVER
701 BASE PORTION
702 INSERTION HOLE
703 LEVER PORTION
71 PIN
711 HEAD PORTION
712 SHAFT PORTION
713 SCREW PORTION
74 CAM
741 ROTATION CAM
742 FIXED CAM
751 NUT
752 THRUST BEARING
753 WASHER
8, 8A, 8B LINER SLOT
80B OPENING PORTION
81B INNER PERIPHERAL SURFACE
81, 81A FIRST PORTION
811, 811A SIDE SURFACE
812, 812A UPPER SURFACE (OUTER SURFACE)
813 FRONT END SURFACE
814 LOWER SURFACE (OUTER SURFACE)
815, 825 THROUGH-HOLE
816, 826 PROTRUSION
816a, 826a FRONT SURFACE PORTION
816b, 826b REAR SURFACE PORTION
816c, 826c TOP SURFACE PORTION
816d, 826d INCLINED SURFACE PORTION
82, 82A SECOND PORTION
82B OUTER SURFACE
821, 821A SIDE SURFACE
822 UPPER SURFACE
823 REAR END SURFACE
824, 824A LOWER SURFACE (OUTER SURFACE)
830 THROUGH-HOLE
831 INNER PERIPHERAL SURFACE
834, 835 PROTRUDING PORTION
100 VEHICLE BODY

The invention claimed is:

1. A steering device comprising:
an upper column having a cylindrical shape that is disposed on a radially outer side of a steering shaft;
a lower column having a cylindrical shape that is fitted to the upper column and is capable of relatively moving in an axial direction with respect to the upper column;
an attachment portion that is attached to the upper column and provided with a column long hole;
a column bracket that includes a side plate portion located on a side of the upper column and is attached to a vehicle body;
a liner slot that is inserted into the column long hole of the attachment portion and restricts an axial movement; and
a pin that extends along a vehicle width direction and penetrates through the side plate portion and the liner slot, wherein
the liner slot is provided with a through-hole through which the pin penetrates, and
the liner slot includes a protrusion protruding from an outer surface facing an inner peripheral surface of the column long hole, pressed against the inner peripheral surface of the column long hole, and facing an outside of the attachment portion.

2. The steering device according to claim 1, wherein the protrusion is provided at a position different from the through-hole in the axial direction.

3. The steering device according to claim 2, wherein the liner slot
is provided with a through-hole penetrating in the vehicle width direction and extending in the axial direction, or
is provided with a recessed portion recessed in the vehicle width direction and extending in the axial direction, and
the through-hole or the recessed portion overlaps the protrusion when viewed in an intersecting direction intersecting the axial direction and the vehicle width direction, and is provided at a position closer to the protrusion than to a first straight line extending in the axial direction through a center of the through-hole.

4. The steering device according to claim 3, wherein
the liner slot includes a first portion located on one side in an axial direction with respect to the through-hole and a second portion located on an other side in an axial direction with respect to the through-hole, and
the first portion is provided with the protrusion on one side in the intersecting direction with respect to the first straight line, and the second portion is provided with the protrusion on an other side in the intersecting direction with respect to the first straight line.

5. The steering device according to claim 3, wherein
the liner slot includes a first portion located on one side with respect to the through-hole in an axial direction and a second portion located on an other side with respect to the through-hole in an axial direction, and
the first portion is provided with the protrusion on an other side in the intersecting direction with respect to the first straight line, and the second portion is provided with the protrusion on one side in the intersecting direction with respect to the first straight line.

6. The steering device according to claim 1, wherein a surface of the protrusion has an inclined surface that approaches the outer surface toward a center in the vehicle width direction.

7. The steering device according to claim 1, wherein the through-hole is circular.

8. The steering device according to claim 1, wherein
the protrusion directly faces both the outside of the attachment portion and a head of the pin, and
the head of the pin is outside of the attachment portion.

9. A liner slot of a steering device,
the liner slot being capable of being inserted into a column long hole of an attachment portion provided on an upper column extending in an axial direction and inserted into the column long hole to restrict movement in the axial direction, the liner slot comprising:
a through-hole through which a pin penetrating through a side plate portion of a column bracket attached to a vehicle body and extending along a vehicle width direction is capable of penetrating; and
a protrusion protruding from an outer surface facing, in a state in which the pin is penetrated through the side plate portion of the column bracket, an inner peripheral surface of the column long hole, pressed against the inner peripheral surface of the column long hole, and facing an outside of the attachment portion.

10. A steering device comprising:
an upper column having a cylindrical shape that is disposed on a radially outer side of a steering shaft;
a lower column having a cylindrical shape that is fitted to the upper column and is capable of relatively moving in an axial direction with respect to the upper column;
an attachment portion that is attached to the upper column and provided with a column long hole;
a column bracket that includes a side plate portion located on a side of the upper column and is attached to a vehicle body;
a liner slot that is inserted into the column long hole of the attachment portion and restricts an axial movement; and
a pin that extends along a vehicle width direction and penetrates through the side plate portion and the liner slot, wherein
the liner slot is provided with a through-hole through which the pin penetrates,
the liner slot includes a protrusion protruding from an outer surface facing an inner peripheral surface of the column long hole and pressed against the inner peripheral surface of the column long hole,
the protrusion is provided at a position different from the through-hole in the axial direction, and
a surface of the protrusion has an inclined surface that approaches the outer surface toward a center in the vehicle width direction.

* * * * *